UNITED STATES PATENT OFFICE.

THOMAS TOMLINSON, OF CLARINDA, IOWA.

LOTION.

SPECIFICATION forming part of Letters Patent No. 390,534, dated October 2, 1888.

Application filed July 21, 1887. Serial No. 244,890. (No specimens.)

*To all whom it may concern:*

Be it known that I, THOMAS TOMLINSON, a citizen of the United States, residing at Clarinda, in the county of Page and State of Iowa, have invented a new and useful Composition of Matter to be Used as a Lotion in the Treatment of Sores, of which the following is a specification.

My composition consists of the following ingredients, combined in the proportions stated, viz: pure water, one gallon; gambier extract, one pound; salt, one and one-half pound; sulphuric acid, two ounces. These ingredients may be thoroughly mingled by agitation.

The lotion is intended for use on man and beast, and in using it it is found best to bathe the sore with it gently at first, and then after a few minutes, when the soreness has gone, the lotion may be applied well.

The use of the lotion has proved it to be very successful in quickly curing sores.

In use the first application checks decomposition, stops suppuration, and prevents putrefaction. The subsequent application removes all soreness and immediately begins to encourage the rebuilding of lost tissue and causes a membrane to form over the sore, excluding the air, when the curative properties of the lotion together with nature will effect a perfect cure, not even causing the hair to fall out or to change color.

After the sore has healed a few light applications may be found desirable to complete the cure.

It will be understood that ordinarily it will be advantageous to add the sulphuric acid to the other ingredients to avoid ebullition in preference to adding the other ingredients to the sulphuric acid.

What I claim, and desire to secure by Letters Patent of the United States, is—

The herein-described composition of matter to be used for the treatment of sores, wounds, and the like, consisting of the following ingredients, in the proportions specified, to wit: water, one gallon; gambier extract, one pound; salt, one and one-half pound, and sulphuric acid, two ounces.

THOMAS TOMLINSON.

Witnesses:
THOMAS W. CAMP,
T. C. BEARD.